United States Patent [19]
Kohlmann et al.

[11] Patent Number: 5,316,673
[45] Date of Patent: May 31, 1994

[54] SPOUT ASSEMBLY FOR SELF-SERVICE PURIFIED WATER DISPENSER

[75] Inventors: Michael J. Kohlmann; Randall K. Williams, both of Edina, Minn.

[73] Assignee: Harmony Brook, Inc., Burnsville, Minn.

[21] Appl. No.: 849,210

[22] Filed: Mar. 11, 1992

[51] Int. Cl.⁵ ............................................. C02F 1/32
[52] U.S. Cl. ..................................... 210/251; 210/95; 210/172; 210/257.1; 210/748; 222/159; 222/185; 222/190; 250/435; 210/198.1
[58] Field of Search ............... 222/113, 159, 185, 190, 222/566; 210/257.1, 748, 172, 198.1, 251, 94, 95; 250/435; 422/24, 186.3

[56] References Cited

U.S. PATENT DOCUMENTS

| | | | |
|---|---|---|---|
| 4,528,093 | 7/1985 | Winer | 210/96.2 |
| 4,623,467 | 11/1986 | Hamlin | 210/259 |
| 4,801,375 | 1/1989 | Padilla | 210/257.2 |
| 4,969,991 | 11/1990 | Valadez | 210/258 |
| 5,112,477 | 5/1992 | Hamlin | 210/257.1 |

Primary Examiner—Neil M. McCarthy

[57] ABSTRACT

An improved dispensing spout assembly and method for self-service dispensing of purified water is described for reducing the possibility of contamination. An overlapping pair of enclosures house an ultraviolet lamp and a delivery nozzle to provide a secondary purification just prior to delivery and to inhibit contact between the nozzle and any contaminated objects, while permitting the exit of purified water to a container.

6 Claims, 5 Drawing Sheets

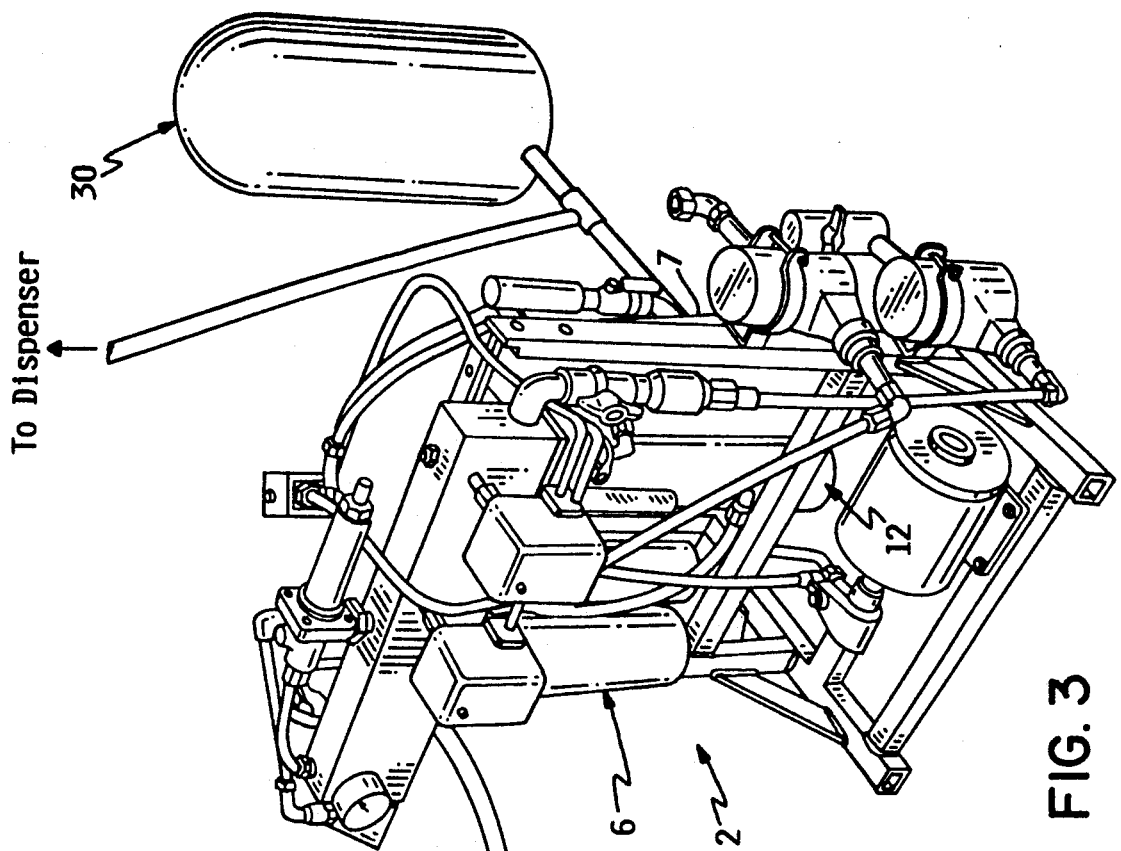

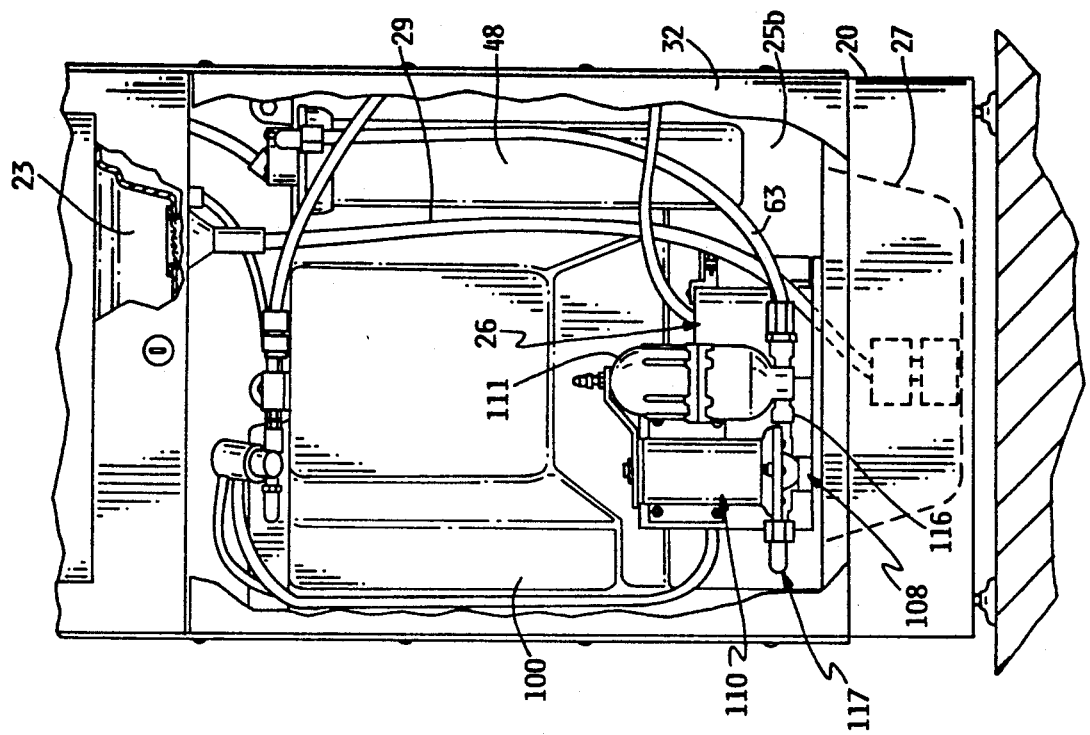
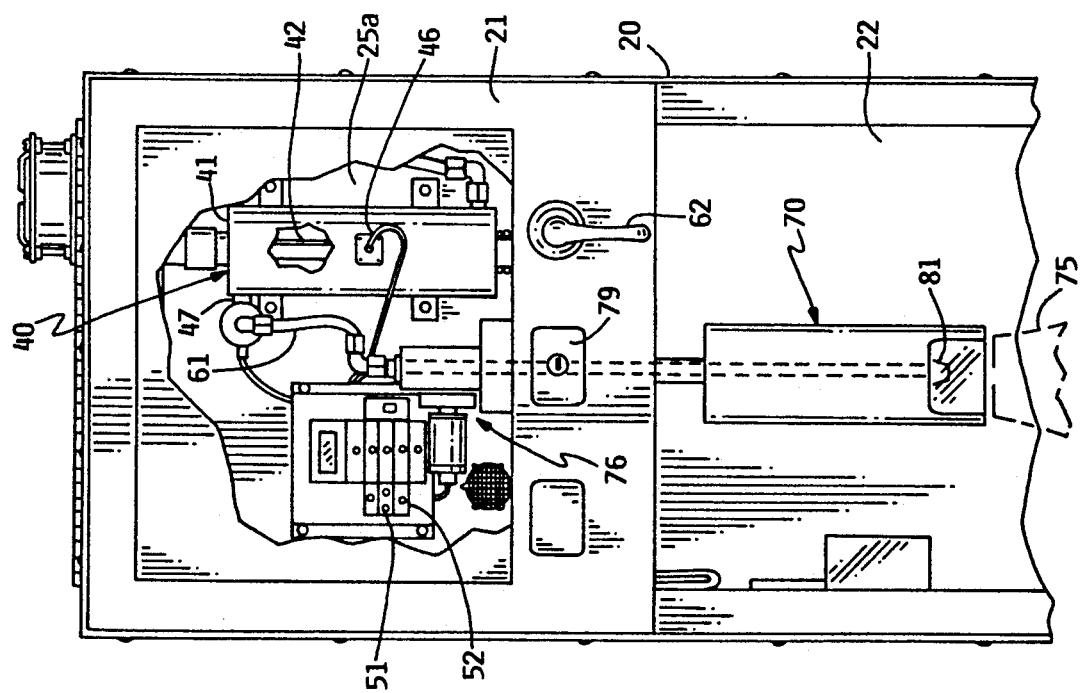

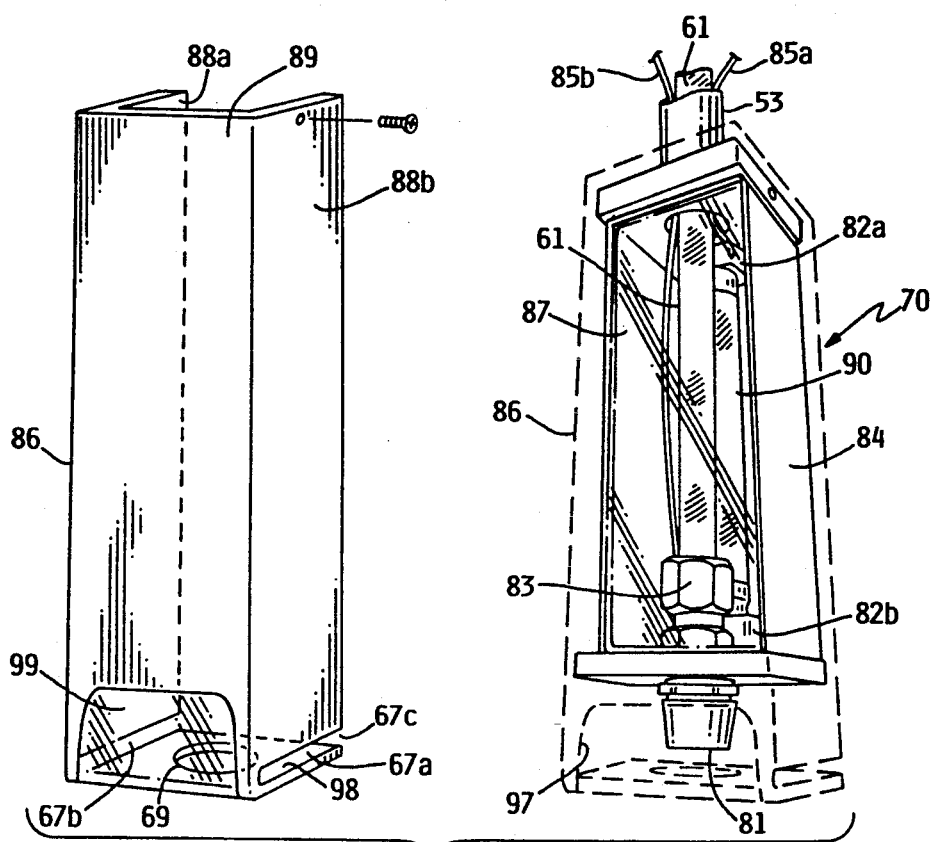
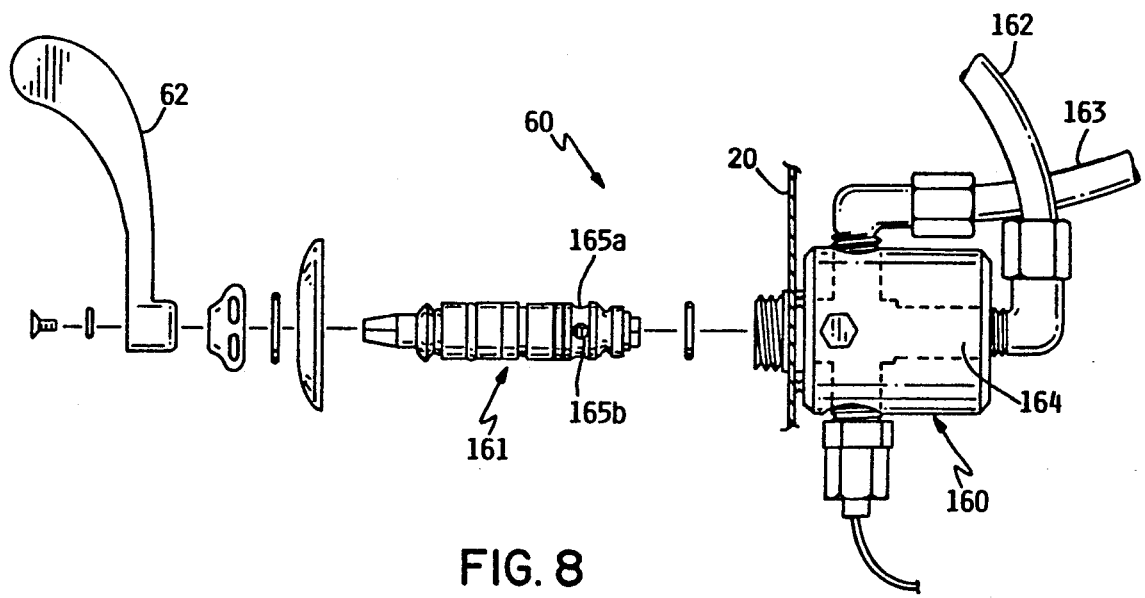
FIG. 7
FIG. 8

SPOUT ASSEMBLY FOR SELF-SERVICE PURIFIED WATER DISPENSER

FIELD OF THE INVENTION

This invention relates to water purification as practiced using a stationary water dispensing station. More particularly, this invention relates to an improved spout assembly containing an ultraviolet lamp and an outer enclosure to prevent contact between the dispensing nozzle and any potentially contaminating object, all to reduce the likelihood of external contamination of the spout.

BACKGROUND OF THE INVENTION

A variety of devices have long been utilized to treat and dispense purified water. Such devices typically include a variety of filters, adsorption mediums and reverse osmosis membranes to remove organic and inorganic substances. Some also include ultraviolet light sources which are used to irradiate the treated water as another means of removing microorganisms that would contaminate the water. As purified water has become more widely used new apparatus and methods have been developed to purify and dispense it to a broader range of locations. One particular type of system allows municipal or approved potable well water to be purified and dispensed to grocery store customers and the like who fill a container at a stationary dispensing unit located on or about the store premises.

In such remote and generally unattended distribution of purified water a variety of unique problems and needs often arise. Such systems typically are unattended for relatively long periods of time. Maintenance may be provided by trained personnel only infrequently, perhaps monthly. Thus, problems with such systems which may arise should be as "self correcting" as possible to prevent long period or transient shut downs between maintenance calls.

One such situation arises when the standard ultraviolet decontaminating light is monitored by a sensor that may sense an ultraviolet light transient output caused by a surge of cold water producing a "below minimum intensity" reading to the sensor. In such systems the sensor would momentarily and unnecessarily shut down the pumping apparatus during this transient event when there is heat sinking of the bulb output. Such momentary shut downs could result in added wear and tear to the processing unit components and an inconvenience to the customer.

Any dispensing location subjects the dispenser to a large variety of environments, many of which may contain airborne contaminants. In addition, self service dispensers are prone to spout contamination from handling by the customers. In some current systems, an ultraviolet light is provided at the spout to help prevent contamination of the spout and purified water which contacts it. Existing spout assemblies containing ultraviolet lights have proven inadequate because the contaminants are not eradicated by the relatively short light. Further, the light and spout have been found to be inadequately enclosed, making the light more difficult to replace and generally providing an inadequate enclosure around the spout area.

SUMMARY OF THE PRESENT INVENTION

The present invention comprises improved purified water dispensing apparatus intended to provide high levels of water purity and dispensing safety for use in a broad range of dispensing environments. The present invention incorporates a secondary ultraviolet irradiation device positioned at the output spout of the dispenser to destroy microorganisms near the spout. This improved spout assembly, with an elongated lamp and an enclosure around the lamp, minimizes airborne and other transmittable contaminants in and around the spout. A further improvement incorporates the use of a noncontaminating material, Delrin by brand name, to form the core of the control valve to prevent metallic material leeching into the water.

The present system may also include a unique impact control slip clutch for a moveable dispensing nozzle and an accumulator tank used in the water dispenser to prevent pump surges, each of which is described in our copending application Ser. No. 07/849,189 filed on even date herewith which is incorporated herein by reference.

BRIEF DESCRIPTION OF THE DRAWINGS

The invention is described in more detail hereinafter with reference to the accompanying drawings, wherein like reference characters refer to the same parts throughout the several views and in which:

FIG. 3 is a perspective view of the processing unit showing various components utilized to purify and pump water through a holding tank and to the dispensing cabinet shown in FIG. 1;

FIG. 5 is a front view of the top portion of the dispensing cabinet shown in FIG. 1 partially broken away to show internal components;

FIG. 6 is a front view of the bottom portion of the dispensing cabinet shown in FIG. 1 partially broken away to show internal components;

FIG. 7 is a perspective view showing the secondary ultraviolet light mounted in a protective enclosure;

FIG. 8 is a side view showing the control valve components in a broken away layout; and

DETAILED DESCRIPTION OF THE INVENTION

A preferred embodiment of the present invention is incorporated into a dispenser 1 (shown in FIG. 1 and 2) used to dispense water which is pretreated in a processing unit 2 shown in FIG. 3. Therefore, to establish the technology in which the present invention finds application, a description of the processing unit and the general dispenser design will be first described.

Figure 4:
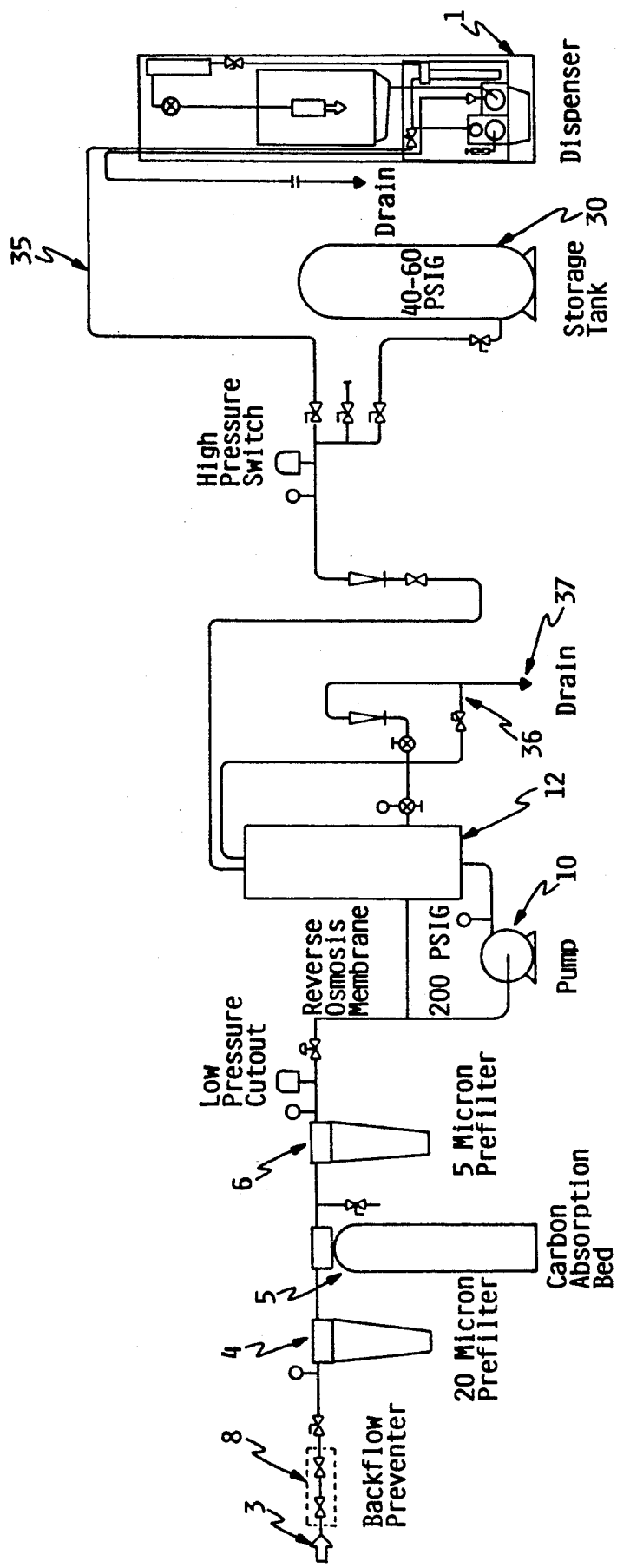
FIG. 4 is a schematic flow diagram showing the stages of water purification of the type which may utilize the present invention.

Processing unit 2 is intended to provide pretreated water having a predetermined level of purity. The following description of the composition of processing unit 2 shown in FIG. 3, and schematically in FIG. 4, is offered as a means of understanding the operation and use of dispenser 1 but other components and individual functions may also be used in processing unit 2 to practice the present invention. Typically processing unit 2 would be placed in a part of the store, such as a back room, where it is out of reach of customers and accessible to service personnel. The water which is pretreated by processing unit 2 would then be directed through tubing (not shown) to dispenser 1, and possibly to other areas needing pretreated water such as a produce misting area, a coffee maker or a drinking fountain.

Processing unit 2 utilizes water supply means to feed water into the processing unit from a municipal or approved potable well water supply line 3. Water is supplied through line 3 at a head pressure in the range of 10 to 100 pounds per square inch (psi). As is shown schematically in FIG. 4, from supply line 3 water flows through a first sediment filter 4 (shown in FIG. 3) which utilizes a twenty micron pleated filter (not shown in Figures) to remove sediment particles which are nominally twenty microns in diameter or larger. The water next flows through carbon adsorption filter bed 5, shown in FIG. 3 and schematically in FIG. 4, containing granular activated carbon to remove various organic contaminants in a manner well known in the filtering art. In the preferred embodiment carbon filter 5 contains approximately 16 pounds of activated carbon. The water then flows through carbon filter 6 which utilizes a five micron carbon filter to remove particles which are nominally five microns or larger in diameter. The specific designs of each of the foregoing filters may vary in accordance with well known water filtration and purification art. As is also well known in the plumbing art, a double check valve or backflow preventer, identified by the numeral 8 in FIGS. 3 and 4, is installed in supply line 3 to prevent any water that may be contaminated by the operations of processing unit 2 or dispenser 1 from being discharged upstream toward the municipal or well supply which may result from any unexpected pressure drop in supply line 3.

Water flows out of carbon filter 6 to a booster pump 10 which increases the head pressure of the water flow to approximately 200 psi. From booster pump 10 the water flows into a reverse osmosis membrane filter 12, shown schematically in FIG. 4. It is the purpose of booster pump 10 to maintain sufficient pressure in reverse osmosis filter 12 to accomplish reverse osmosis filtration in accordance with well known filter design art. While reverse osmosis filter 12 may have any variety of design as is well known in the art, in the preferred embodiment reverse osmosis filter 12 contains a spiral wound thin film composite semi permeable membrane. The general operation of reverse osmosis membrane filter 12 involves the forced flow of the water supply across the semi permeable membrane under a suitable pressure, varying in accordance with the specific membrane design. The semi permeable membrane can have various configurations, but, in general, the membrane is designed with a porosity which allows water molecules, having a known and finite size, to flow through the membrane, but which does not allow other elements, such as the molecules or ions of various dissolved solids and contaminants, to pass through the membrane. In a manner well known in the art it is necessary to continually flush the membrane with water to wash away the contaminants which are not able to cross the membrane. This flushing circuit, designated by the numeral 36, leads to a flush drain 37, each being shown schematically in FIG. 4 and having a construction of the type well known in the plumbing art.

The water supply which has been pretreated by processing unit 2 is stored in one or more storage tanks, each designated by the numeral 30 in FIGS. 3 and 4. Storage tank 30 is a bladder type design wherein a flexible membrane (not shown in the Figures) expands and contracts with air pressure on one side, and the water supply on the other, to allow the tank 30 to be filled and emptied without the pretreated water supply coming into contact with the outside contaminated air. From storage tank 30 the pretreated water is routed out of processing unit 2 through a transfer pipe 35 to dispenser 1 as shown schematically in FIG. 4. Transfer pipe 35 may carry all of the pretreated water directly to dispenser 1 or it may have multiple outlets. For instance, in some supermarket applications, the pretreated water would be used to mist the produce racks to help keep refrigerated vegetables moist.

Figures 1, 2:
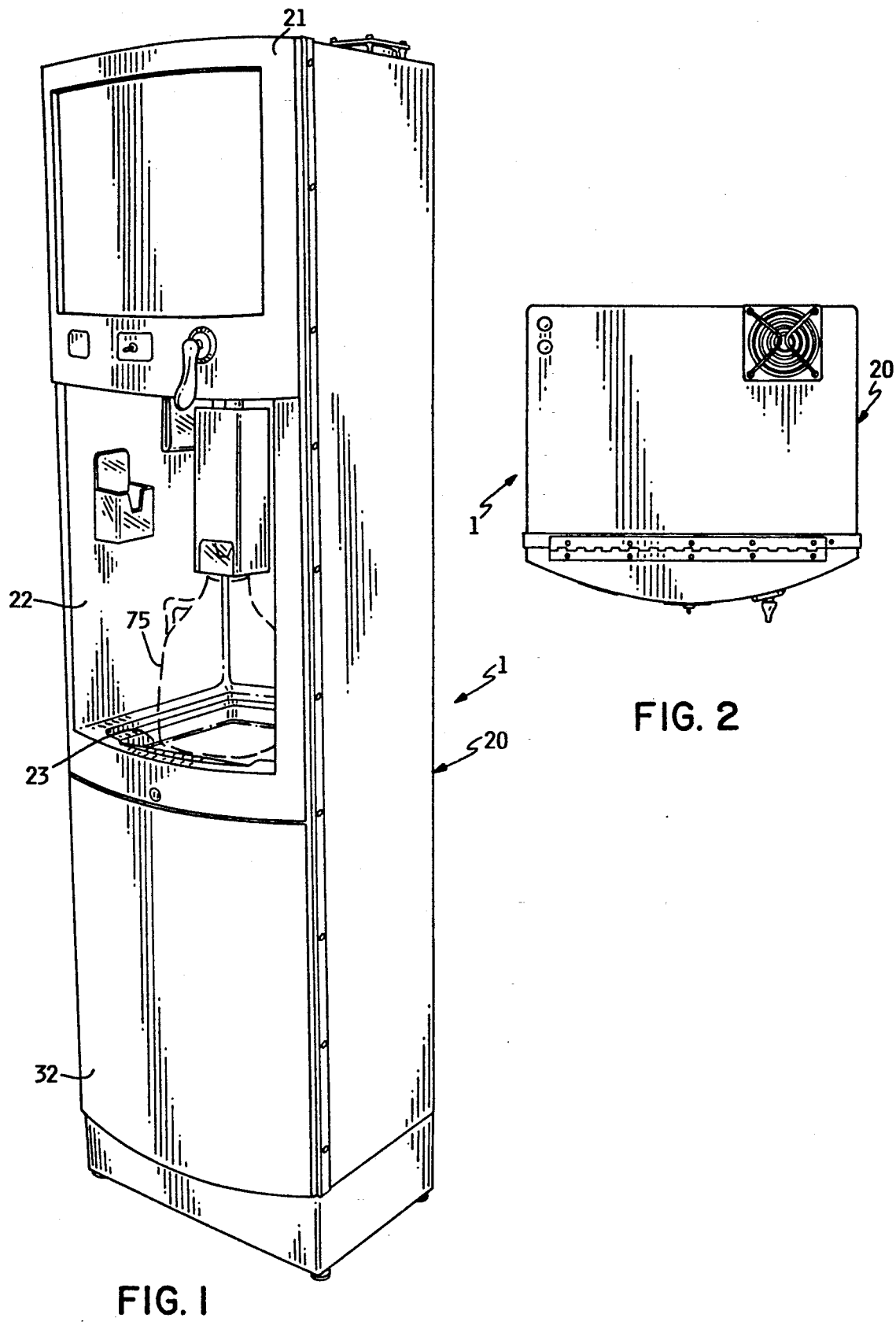
FIG. 1 is a perspective orthogonal view of a dispensing cabinet of the type which utilizes the present invention.
FIG. 2 is a top planform view of the dispensing cabinet shown in FIG. 1.

The preferred embodiment of the present invention is incorporated in dispenser 1 shown in FIGS. 1 and 2. Thus, a general description of it will be provided. Typically dispenser 1 will be located in a location apart from the location of processing unit 2. It is generally located in an area of the store where a customer can conveniently reach it. Water from processing unit 2 is fed to dispenser 1 by means of any variety of FDA approved tubing or piping well known in the art. Dispenser 1 comprises a free standing cabinet 20 having an upwardly hinged top front panel 21 and a removable bottom front panel 32. Located behind panels 21 and 32 is an equipment bay having an upper portion 25a and a lower portion 25b. Front panel 21 is contoured to form a dispensing compartment 22 that is open on the side facing the front of dispenser 1. Dispensing compartment 22 is the area where the customer would place his or her jug for filling with purified water. A dispensing spout assembly 70, shown in FIG. 5 and as will be described in more detail subsequently, is located in the top of compartment 22 and a drain well 23 (shown in FIG. 1) is formed in the bottom for any overflow water. Drain well 23, as is shown in FIG. 6, connects to a drain pipe 29 which empties into a drain basin 27. A sump pump 26 pumps water out of drain basin 27 and out of cabinet 20 to a remote floor drain.

Water entering cabinet 20 from processing unit 2 is stored in dispenser storage tank 100 shown in FIG. 6. When a customer desires to draw water, he or she activates control valve handle 62 to activate cabinet pump 110. Pump 110 pumps water through a line 116 shown in FIG. 6. Line 116 communicates with an accumulation tank 111 and also with line 63 which connects with filter 48. From filter 48 the water is routed through primary ultraviolet treating assembly 40, as shown in FIG. 5, at the approximate flow rate of 2.5 gallons per minute. Ultraviolet treating assembly 40 is intended to use ultraviolet light to irradiate the water supply passing by it to kill any bacteria or other susceptible microorganisms that may be present in the water. Treating assembly 40 comprises a housing 41 through which water is pumped, and an ultraviolet lamp 42 positioned generally in the center of housing 41 such that the ultraviolet light it emits passes through the water in housing 41 to irradiate it, and past an ultraviolet sensor 46 to be described in detail subsequently. After the water has been irradiated by lamp 42 it is routed past an ultraviolet sensor 46, to be described subsequently, and on through line 61 to dispensing spout assembly 70 as shown in FIGS. 5 and 7.

It is important that treatment lamp 42 be continually functioning at a specified intensity when purified water is being dispensed so that the water is fully treated. To assure that this occurs an ultraviolet monitoring system is used, including a sensor 46, shown in FIG. 5, which senses the ultraviolet light intensity emitted by ultraviolet lamp 42 after it has passed through the water contained in housing 41. As is well known in the water purification art, an ultraviolet lamp must be calibrated to a specified luminosity to assure that sufficient ultraviolet light is emitted to destroy the specified microorganism. Sensor 46 is positioned in the side wall of housing 41 as shown in FIG. 5. In the preferred embodiment, sensor 46 is manufactured by Silonex and identified as part number:NSL-2129/3 and such devices are well known in the ultraviolet lamp art. In the preferred embodiment a new lamp 42 will have an average dosage through the water, and accounting for the loss due to the quart exterior of lamp 42, on the order of 48,000 micro watts-sec/cm2, employing a safety factor of 3. Sensor 46 is calibrated to sense a minimum dosage of 16,000 micro watt-sec/cm2. At any time that sensor 46 does not sense ultraviolet light intensity in the preselected range, it is assumed that a condition exists where the level of ultraviolet light is below the minimum level needed for targeted germicidal control. When this level is sensed a monitoring light 51 on a display panel 52, shown in FIG. 5, and designated by the nomenclature "below minimum", remains illuminate.

The flow of water out of dispensing spout assembly 70 is controlled by means of dispensing control valve 60 shown in FIG. 8, having a control handle 62 mounted to the front of cabinet 20 as shown in FIG. 5. Rotation of control handle 62 by the customer provides a variable flow of water out of nozzle 81 shown in FIG. 5. Water flows to control valve 60 from line 162 shown in FIG. 8 and out control valve 60 through line 163 connecting to ultraviolet light assembly 40. Because of this location in the flow circuit, control valve 60 necessarily contacts water that has already been purified. Presently utilized control valves in purified water dispensers are made of a variety of metals. Some metals, particularly the cast metals, can impart toxins from their metal surfaces to the water which the valve is controlling. Thus, the purity of the water is degraded. One aspect of the present invention is the inclusion of a non toxic material in control valve 60 to help eliminate this source of contamination. In particular, referring to FIG. 8, control valve 60 is comprised of a variety of components generally known in the control valve art. In the preferred embodiment of control valve 60, it is comprised of handle 62, a valve body 160, and a rotating valve core 161. A series of threaded washers (not identified in the drawings) may be used to mount valve 60 to the wall of cabinet 20. Water controlled by valve 60 enters through line 162 and exits via line 163, shown in FIG. 8. Core 161 is rotatably mounted in valve chamber 164. Passages 165a and 165b in core 161 allow water to pass through valve 60 if control handle 62 is rotated with the passages indexed to matching passageways in chamber 164. Core 161 is machined from a polished high quality brass material having a surface that does not pose significant leaching problems. However, up until the present, valve body 160 has been manufactured from cast material that contain leeching materials such as lead. To avoid this source of toxicity, the present invention utilizes a non toxic FDA approved material for valve body 160. In the preferred embodiment this material is Delrin manufactured by Dupont. This material may also be other than Delrin as long as it is non toxic in accordance with FDA requirements.

The invention herein comprises the inclusion of a substantially elongated, enlarged and encased ultraviolet spout lamp 90 located in dispensing spout assembly 70 shown in FIGS. 5 and 7. It has been found that a secondary ultraviolet source within the dispensing spout assembly provides superior purification over the prior art devices which were short penlight type bulbs, difficult to remove, unreliable and poorly enclosed both from a standpoint of servicing and from a standpoint of spout sanitation as will be discussed subsequently. The present invention utilizes an elongated ultraviolet lamp 90 mounted at each end by lamp receptacles 82a and 82b connected to electrical leads 85a and 85b, respectively, as shown in FIG. 7. It is important that lamp 90 be elongated having a length of at least three inches, being five inches in the preferred embodiment, to provide sufficient and elongated luminosity. In the preferred embodiment lamp 90 is a 4 watt lamp provided by Bulbtronics. This elongated design provides a longer disinfection path over which contaminants are destroyed which would otherwise enter the water supply from air contamination or handling contamination around dispensing nozzle 81. This problem is exacerbated as the dispenser stands unused and the contaminants have time to migrate upwardly from dispensing nozzle 81 in the standing water adjacent to lamp 90. The elongation of lamp 90 also provides additional irradiation as water passes past it while being dispensed. Lamp 90 is mounted parallel to, and generally adjacent a section of clear water conduit 61 through which the dispensed water passes. Water line or conduit 61 is constructed from clear Teflon brand material which allows ultraviolet light to pass through it. Teflon brand material has been found to withstand the degradation that often occurs from ultraviolet light. To provide adequate volume and area for irradiation, conduit 61 has a ½ inch outer diameter and a ⅜ inch inner diameter in the preferred embodiment.

To facilitate the ease with which lamp 90 may be removed, conduit 61 is removably mounted to a fitting 83, shown in FIG. 7, which is operably connected to nozzle 81. By loosening fitting 83, conduit 61 can be taken out of the way of lamp 90 for removal. To protect lamp 90 from breakage and to minimize the likelihood that contaminants from the air or from customers hands would contact nozzle 81, a three component assembly of covers is utilized. First, a three-sided protective metal inner enclosure 84 surrounds the back and two sides of lamp 90 as shown in FIG. 7. In the preferred embodiment enclosure 84 is constructed of steel.

Secondly, a removable glass panel 87 spans the opening in front of lamp 90 formed by the two sides of enclosure 84. Glass panel 87 protects lamp 90 from breakage and also is an absorber of ultraviolet light. Thus, it prevents over 90 percent of the ultraviolet light from lamp 90 from impinging on an outer enclosure 86 which would otherwise degrade enclosure 86 as is described subsequently. Also, this reduction in ultraviolet light protects maintenance personnel from possible eye injury from the ultraviolet lamp. Glass panel 87 is removable to facilitate the removal of lamp 90.

The third element of the dispensing spout assembly is a removable outer enclosure 86 that surrounds enclosure 84 on its front and on its two sides. Outer enclosure 86 has four set screws (one representative one being shown in the drawings) by which it can be fixed in place over enclosure 84. By removing the set screws, outer enclosure 86 can be removed. Outer enclosure 86 is made from a plastic material which would tend to be degraded by ultraviolet light if it were not shielded by glass panel 87 and metallic inner enclosure 84. Outer enclosure 86 is comprised of two translucent side panels, 88a and 88b, as is shown in FIG. 7, and a generally translucent front panel 89. The bottom edge of front panel 89 bends backwardly, extending to the back edges of panels 88a and 88b to form bottom panel 98. The top surface of panel 98 is spaced below and apart from the bottom of dispensing nozzle 81, this distance being approximately one inch in the preferred embodiment, The side edges of panel 98 are spaced downwardly apart from the lower edges of side panels 88a and 88b approximately ¼ inch to form openings 67a and 67b adjacent the bottom of panels 88a and 88b, respectively. The back edge of panel 98 is spaced downwardly a like distance from the bottom edge of the back panel of enclosure 84 to form opening 67c. The purpose of these side openings is to provide overflow drainage so that if a jug positioned with its mouth or opening pushed up against bottom panel 98 overflows, the water will not back up into enclosure 86, but will be drained away by openings 67a, 67b and 67c. A circular opening 69 in the approximate center of bottom panel 98 allows water to flow through panel 98 from dispensing nozzle 81. This design of outer enclosure 86 allows dispensing nozzle 81 to be protected from contamination from the hands of customers as well as airborne contaminants, thus serving as a "sneeze guard". It also prevents water from a filled jug from spurting outwardly toward the customer by providing drain areas.

Further detailing outer enclosure 86, a generally square clear plastic area 99 is provided in the bottom front portion of panel 89 as shown in FIG. 7. The purpose of clear area 99 is to allow the customer to see the dispensing nozzle 81 and water flowing from dispensing nozzle 81 into the jug mouth. In addition, the use of a translucent material for enclosure 86 allows the customer to see the glow of lamp 90, thus assuring them that ultraviolet irradiation of the water they are purchasing is taking place.

The methods of the present invention includes a method whereby time delay means are inserted between a pump means and a sensor means such that when the sensor means senses a below minimum reading for ultraviolet light intensity the time delay means is initiated. The time delay means then times out, in the preferred embodiment, for a period of two minutes. If the intensity remains below the minimum requirements after the time delay has elapsed, the pump means shuts down. If not, the pump means remains active.

What is claimed is:

1. An apparatus for self-service delivery of purified water to consumers, containing a source of water, means for purifying the water, and means for delivering purified water to a container through a dispensing nozzle housed in a dispensing spout assembly, said dispensing spout assembly comprising:

a conduit transparent to ultraviolet light, containing an inlet, at an upper end thereof, for receiving purified water, and an exit, at a bottom end thereof, fluidly connected to said dispensing nozzle;

means for irradiating water within said conduit with ultraviolet light of sufficient wavelength and intensity to destroy substantially all microorganisms therein;

an outer enclosure, encompassing said conduit and said dispensing nozzle, said outer enclosure containing a front panel, two side panels, and a bottom panel, said bottom panel being an extension of said front panel and positioned generally perpendicular to said front panel and downwardly away from the two side panels, and also downwardly away from said dispensing nozzle, whereby purified water may exit from said dispensing spout assembly and whereby said dispensing nozzle may be protected from contact with contaminated objects;

an inner enclosure, substantially opaque to ultraviolet light, encompassing said conduit and said irradiating means on three sides along the length of said conduit, said inner enclosure being encompassed by said outer enclosure;

a glass plate, substantially opaque to ultraviolet light, attached to said inner enclosure to form a fourth side encompassing said conduit and said irradiating means along the length of said conduit, whereby a purifying treatment of ultraviolet irradiation may be applied to water in said dispensing spout assembly.

2. An apparatus as recited in claim 1, wherein said irradiating means comprises an ultraviolet lamp removably attached to said inner enclosure, and positioned generally adjacent to and parallel with said conduit along substantially the entire length thereof, whereby water may be irradiated throughout said conduit.

3. An apparatus as recited in claim 2, wherein the bottom panel on said outer enclosure contains at least one aperture therein for the passage therethrough of purified water from said dispensing nozzle.

4. An apparatus as recited in claim 3, wherein said inner enclosure is made from a metallic substance.

5. An apparatus as recited in claim 4, wherein said metallic substance is steel.

6. An apparatus as recited in claim 2, wherein said glass plate is removably attached to said inner enclosure to facilitate replacement of said ultraviolet lamp.

* * * * *